United States Patent [19]

Kukimoto et al.

[11] Patent Number: 5,317,060
[45] Date of Patent: May 31, 1994

[54] PROCESS FOR PRODUCING COMPOSITE RESIN FOR TONER

[75] Inventors: Yutaka Kukimoto; Hikoji Ueda; Kozo Suzuki; Yoshihiko Koshiyama, all of Itabashi, Japan

[73] Assignee: Fujikura Kasei Co., Ltd., Tokyo, Japan

[21] Appl. No.: 983,129

[22] Filed: Nov. 30, 1992

[30] Foreign Application Priority Data

Nov. 29, 1991 [JP] Japan .................. 3-339566

[51] Int. Cl.$^5$ .............................. C08L 33/08
[52] U.S. Cl. .................. 525/197; 525/223; 525/227; 525/228; 525/230
[58] Field of Search ............... 525/227, 228, 223, 197, 525/230

[56] References Cited

U.S. PATENT DOCUMENTS 4,774,291 9/1988 Maeda .................................. 525/197
5,185,405 2/1993 Nishida .............................. 525/228

FOREIGN PATENT DOCUMENTS 2054749 3/1987 Japan .

*Primary Examiner*—James J. Seidleck
*Assistant Examiner*—I. Zemel
*Attorney, Agent, or Firm*—Wenderoth, Lind & Ponack

[57] ABSTRACT

A process for producing a composite resin for a toner, comprising the steps of: mixing, in water, (a) a low-molecular weight polymer powder comprising particles, not less than 80% by weight of the particles having a diameter of from 20 to 2000 microns with (b) a high-molecular weight polymer emulsion; subjecting the thus obtained mixture to a coagulation treatment; and heating the resulting mixture to obtain a composite resin in which the low-molecular weight polymer particle and the high-molecular weight polymer are fixed and homogeneously mixed with each other.

3 Claims, No Drawings

PROCESS FOR PRODUCING COMPOSITE RESIN FOR TONER

BACKGROUND OF THE INVENTION

The present invention relates to a process for producing a composite resin for use in a toner for developing an electrostatic image in electrophotography.

A heating roller fixation method wherein a toner image formed on an image receiving sheet is permanently fixed on the sheet by thermal fusion is popular in the electrophotography. In this method, since the surface of a heating roller is press-bonded to the surface of an image on a fixation sheet, the heat efficiency in heat fusion of the toner image on the fixation sheet is so excellent that rapid fixation can be conducted, which renders this method very favorable for use in an electrophotographic copying machine.

On the other hand, in the above-described heating roller fixation method, the toner should preferably satisfy important property requirements such as softening at a relatively low temperature for the purpose of exactly fusing the toner on a fixation sheet (that is, excellent fixation), free from adhesion and retention of the toner on the roller even when the heating roller temperature is relatively high (that is, excellent non-hot-offset property), and the like. A process which is recognized in the art as preferable for satisfying the above-described property requirements comprises homogeneously mixing a low-molecular weight polymer having an excellent fixation with a high-molecular weight polymer having an excellent non-hot-offset property and using the polymer mixture as a resin for a toner. This is disclosed in, for example, Japanese Patent Publication No. 6895/1980, Japanese Patent Laid-Open Nos. 114245/1979 and 36558/1983.

For this reason, various proposals have hitherto been made on methods of homogeneously mixing the low-molecular weight polymer with the high-molecular weight polymer. All these conventional processes, however, have the following problems, and the alleviation in the problems have been desired in the art.

(1) Process wherein a low-molecular weight polymer and a high-molecular weight polymer are separately prepared and both the polymers are mixed with each other in the state of a dry powder. The low-molecular weight polymer is generally different from the high-molecular weight polymer in the softening point and melt viscosity. For this reason, in the case of the mixed polymer produced by this process as a resin for a toner, the low-molecular weight polymer powder is preferentially melt in the step of heat-melt kneading in the production of a toner, and the high-molecular weight polymer powder which has not been sufficiently melt is agglomerated and dispersed in the melt, so that it is unfavorably difficult to homogeneously mix both the polymers with each other. As a result, in the finally obtained toner, scattering of molecular weight distribution occurs between toner particles, which gives rise to problems including that it is difficult to homogeneously mix a compounding agent for a toner, such as a colorant, and no sufficient hot-offset property can be attained.

(2) Process which comprises dissolving a low-molecular weight polymer and a high-molecular weight polymer respectively in different solvents, mixing both the polymers in a solution state and removing the solvent by drying under reduced pressure or spray drying to give a mixed polymer. In this process, when the difference in the molecular weight between both the polymers is large, there occurs a remarkable difference in the solubility of both the polymers in a solvent. This makes it difficult to prepare particularly a highly concentrated solution of the high-molecular weight polymer, so that it becomes difficult to prepare a mixed polymer in any combination of the molecular weights at any mixing ratio. Further, the step of dissolving a polymer, a step of removing a solvent, and the like becomes necessary, which unfavorably increases the production cost.

(3) Process which comprises mixing a low-molecular weight polymer and a high-molecular weight polymer with each other in the form of separate emulsions and subjecting the mixture to steps such as coagulation, washing, dehydration and drying to produce a mixed polymer. In this process, since both the polymers are mixed with each other in the form of a particle having a diameter of 1 $\mu$m, the mixture becomes so homogeneous that good toner properties can be obtained. However, a remarkable lowering in the fluidity of the mixed emulsion occurs in the coagulation treatment in the production of the mixed polymer. In order to improve the fluidity, it is necessary to use water in an amount 15 to 20 times that of the polymer. Further, since the resultant mixed polymer particle is in the form of a granule which comprises a loosely solidified emulsion agglomerate having a particle diameter of 5 to 20 $\mu$m, the drying property is poor and the mechanical strength is unsatisfactory, which renders this process unsuitable for use on a commercial scale.

(4) Process disclosed in Japanese Patent Publication No. 6895/1980, Japanese Patent Laid-Open Nos. 114245/1979 and 36558/1983, which comprises producing a low-molecular weight polymer by suspension polymerization, subsequently conducting suspension polymerization to produce a high-molecular weight polymer (or a process which comprises previously producing a high-molecular weight polymer by suspension polymerization and subsequently producing a low-molecular weight polymer). In this process, a resin for a toner can be advantageously prepared in a homogeneously mixed state because the polymer particle formed in the first suspension polymerization is dissolved in a monomer added in the second-stage polymerization to continue the suspension polymerization of the monomer. Since, however, it takes a lot of time to prepare a high-molecular weight polymer by suspension polymerization, the production cost becomes high. Further, since the particle diameter of the polymer formed in the first suspension polymerization is relatively large, it takes a lot of time to dissolve the polymer particle in a monomer added at the time of the second-stage suspension polymerization. In some cases, dissolution becomes insufficient, which has an adverse effect on the electrophotographic properties of the finally obtained toner. Further, since there is a limitation on the molecular weight of the high-molecular weight polymer which can be produced by the suspension polymerization, it is difficult to mix a polymer having a high molecular weight sufficient to attain a good offset property.

(5) Process disclosed in Japanese Patent Laid-Open No. 88003/1985 filed by the present applicant which comprises producing a low-molecular weight polymer by suspension polymerization, wherein suspension polymerization is conducted in the presence of a high-molecular weight polymer emulsion particle in the suspension polymerization system to composite the low-molecular weight polymer with the high-molecular weight polymer. In this method, the step of preparing a high-molecular weight polymer through suspension polymerization can be omitted as opposed to the suspension polymerization-suspension polymerization in the above-described process (4). Since the high-molecular weight polymer is in the form of a small emulsion particle, it is easily dissolved in the monomer during the suspension polymerization. This process has features including that any high-molecular weight polymer having a capability of sufficiently imparting a good non-offset property can be mixed in any ratio. In this process, however, a special dispersion stabilizer is necessary for conducting a suspension polymerization with an emulsion system different from the suspension polymerization system being present in the suspension.polymerization system. The special dispersion stabilizer has an adverse effect on the environmental stability of the resultant toner.

SUMMARY OF THE INVENTION

Under the above-described circumstances, the present invention has been made as a result of extensive and intensive studies of the present inventors, and an object of the present invention is to provide a production process which enables a toner resin capable of imparting favorable fixation and non-hot-offset property to the toner to be very easily produced with a high production efficiency.

The process for producing a composite resin for a toner provided by the present invention comprises the steps of: mixing, in water, (a) a low-molecular weight polymer powder comprising particles, not less than 80% by weight of said particles having a diameter of from 20 to 2000 microns with (b) a high-molecular weight polymer emulsion in water; subjecting the thus obtained mixture to a coagulation treatment; and then heating the resulting mixture to obtain a composite resin in which the low-molecular weight polymer particle and the high-molecular weight polymer are affixed and homogeneously mixed with each other.

PREFERRED EMBODIMENTS OF THE INVENTION

In the process for producing a composite resin for a toner according to the present invention comprising the above-described constitution, a low-molecular weight polymer capable of imparting a good fixation to the toner is fed in the form of a powder having a particle diameter of 20 to 2000 $\mu$m. A high-molecular weight polymer capable of imparting a favorable non-hot-offset property to the toner is separately fed in the form of an emulsion. Both the polymer components are homogeneously mixed with each other in water. Then, in the subsequent step of coagulation treatment of the high-molecular weight polymer emulsion, the emulsion particle is adsorbed or secured in the form of a very fine agglomerate particle having a size of about 0.1 to 5 $\mu$m on the surface of the low-molecular weight polymer powder. At this stage, the mixing of both the polymers is highly homogenized, and in the subsequent step of heat treatment, both polymers are completely fused and/or fixed to each other thereby to form a composite resin.

Therefore, in the present invention, since the low-molecular weight polymer powder corresponds to the nucleus of the composite resin, it is important that at least 80% by weight of the powder particles have a diameter in the range of from 20 to 2000 $\mu$m. The particle diameter is particularly preferably in the range of from 100 to 1000 $\mu$m. In the case where the particle diameter of the powder is less than 20 $\mu$m, as with the case of the above-described conventional mixing of polymer emulsions with each other, since the fluidity of the mixture system lowers in the coagulation treatment, it becomes necessary to add a large amount of water. Further, since the particle diameter of the formed particle as well is small, the drying property is poor, which leads to a remarkable lowering in the productivity. On the other hand, when the particle diameter of the low-molecular weight polymer exceeds 2000 $\mu$m, the surface area per unit weight becomes so small that it becomes difficult for the coagulated particle of the high-molecular weight polymer emulsion to be adsorbed on the surface of the powder particle. Further, it becomes difficult to affix the high-molecular weight polymer in an amount sufficient to attain a good non-hot-offset property.

In the above-described low-molecular weight polymer powder, the weight average molecular weight (Mw) is preferably in the range of from $10^3$ to $5 \times 10^5$, particularly preferably in the range of from $8 \times 10^3$ to $6 \times 10^4$, for the purpose of imparting a favorable fixation to the finally obtained toner. When the Mw value is smaller than $5 \times 10^3$, although the fixation becomes better, the durability of the toner becomes poor and this has an adverse effect on the storage stability. On the other hand, when the Mw value exceeds $10^5$, it becomes difficult to attain a good fixation.

There is no particular limitation on the polymer usable as the above-described low-molecular weight polymer powder, and use may be made of any of various binder resins commonly used in the electrophotographic toner. Specific examples thereof include vinyl resins such as styrene resin, styrene-acrylic copolymer resin and styrene-butadiene copolymer resin, and epoxy resins, polyester resins, polyether resins, rosin-modified phenolic resins and polyurethane resins. Particularly preferred examples thereof include styrene-acrylic copolymers produced by copolymerizing a styrene monomer with various acrylic ester monomers or methacrylic acid ester monomers.

Specific examples of the styrene monomer in the styrene-acrylic copolymer include styrenes such as styrene, o-, m- or p-methylstyrene, $\alpha$-methylstyrene, p-ethylstyrene and p-tert-butylstyrene, and specific examples of the acrylic ester monomer or methacrylic ester monomer include ethylenically monocarboxylic esters such as methyl acrylate, ethyl acrylate, n-butyl acrylate, isobutyl acrylate, n-octyl acrylate, 2-ethylhexyl acrylate, chloroethyl acrylate, methyl methacrylate, ethyl methacrylate, n-butyl methacrylate, isobutyl methacrylate, n-octyl methacrylate, dodecyl methacrylate and stearyl methacrylate. Further, if necessary, these monomers can be copolymerized with other monomer, and specific examples of the other monomer include vinylnaphthalenes, ethylenically unsaturated monoolefins such as ethylene, propylene, butylene and isobutylene, vinyl esters such as vinyl chloride, vinyl fluoride, vinyl acetate and vinyl butyrate, ethylenically monocarboxylic acid derivatives such as acrylonitrile, acrylamide and methacrylamide, vinyl methyl ether, vinyl ethyl ether and vinyl isobutyl ether.

There is no particular limitation also on the process for producing a low-molecular weight polymer powder according to the present invention. For example, use may be made of a method which comprises polymerizing the above-described monomer component for forming a low-molecular weight polymerization by bulk polymerization, solution bulk polymerization, solution polymerization, suspension polymerization, emulsion polymerization, etc., taking out the resultant polymer as a solid matter from the system according to need and pulverizing the polymer by a general pulverization method so that the particle diameter is in the range of from 20 to 2000 μm.

The use of the low-molecular weight polymer powder in a dry state is not always required, and the low-molecular weight polymer powder may be used in the form of a wet powder or an aqueous suspension containing the powder. For example, in the case of the suspension polymerization, when the suspension polymerization is conducted with a monomer for forming a low-molecular weight polymer being dispersed in water containing a dispersion stabilizer, a suspension containing a low-molecular weight polymer powder is obtained and a high-molecular weight polymer emulsion can be directly added to this suspension, which enables the process to be continuously practiced subsequent to the production of the low-molecular weight polymer powder. Therefore, in the present invention, it is preferred to produce the low-molecular weight polymer powder through suspension polymerization.

The Mw value of the high-molecular weight polymer emulsion used in the present invention is preferably in the range of from $5 \times 10^5$ to $5 \times 10^6$, particularly preferably in the range of from $2 \times 10^6$ to $5 \times 10^6$ for the purpose of imparting a non-hot-offset property to the finally obtained toner.

There is no particular limitation on the kind of the polymer constituting the high-molecular weight polymer emulsion, and use may be made of emulsions of various resins for a toner exemplified in the low-molecular weight polymer powder. It is particularly preferred to use a styrene-acrylic polymer emulsion produced by polymerizing styrene and an acrylic monomer through known emulsion polymerization so that the Mw value is as high as $5 \times 10^5$ to $5 \times 10^6$. It is not always necessary for the polymer component of the high-molecular weight polymer emulsion used in the present invention to coincide with the polymer component of the low-molecular weight polymer powder, and use may be made of a combination of different polymer components depending upon properties required in the toner.

Further, in the present invention, besides the above-described high-molecular weight polymer emulsion, a wax emulsion, a polyolefin resin emulsion, a silicone resin emulsion, a fluororesin emulsion, etc., may be used in combination with the above-described high-molecular weight polymer emulsion for the purpose of improving various properties of the toner, for example, improving the releasability.

Thus, in the present invention, after the low-molecular weight polymer powder is homogeneously mixed with the high-molecular weight polymer emulsion in water, the mixture is subjected to a coagulation treatment and a heat treatment to produce a composite resin for a toner. In some cases, the viscosity of the mixed system increases at the time of mixing of both the polymers and particularly at the time of the subsequent step, that is, coagulation treatment, which hinders the homogeneous mixing of both polymers and the mixing work. Therefore, the expression "mixing in water" used herein is intended to mean that the mixing of both polymers is conducted in such a state that a suitable amount of water is added in expectation of the increase in the viscosity. When the increase in the viscosity at the time of mixing or coagulation treatment is not very large, since the high-molecular weight polymer emulsion per se is aqueous, the mixing can be conducted also by directly adding the low-molecular weight polymer powder to the emulsion without the addition of water. This method as well is embraced in "mixing in water" in the present invention.

In the mixing of the low-molecular weight polymer with the high-molecular weight polymer emulsion, the proportions of mixing of the low-molecular weight polymer powder and the high-molecular weight polymer emulsion (on a solid basis) are preferably in the range of from 65 to 95% by weight and in the range of from 35 to 5% by weight, respectively, particularly preferably in the range of from 70 to 90% by weight and 30 to 10% by weight, respectively, for the purpose of imparting favorable fixation and non-hot-offset property in balance to the toner. In the above-described proportions, when the proportion of the low-molecular weight polymer powder is lower than 65% by weight and the proportion of the high-molecular weight polymer emulsion is higher than 35% by weight, the melt viscosity of the resultant composite resin becomes so high that although the non-offset property at a high temperature becomes good, the fixation becomes poor. On the other hand, when the proportion of the low-molecular weight polymer powder is higher than 95% by weight and the proportion of the high-molecular weight polymer emulsion is lower than 5% by weight, although the fixation becomes good, an offset phenomenon is liable to occur at a high temperature. In both cases, the balance between the fixation and the non-hot-offset property becomes poor.

In the present invention, the coagulation treatment can be conducted through the use of a coagulating agent commonly used in the coagulation treatment of latex, for example, electrolytes such as NaCl, KCl, $Na_2SO_4$, $CaCl_2$, $MgSO_4$, $CuSO_4$ or $Ca(NO_3)_2$ according to a conventional method. In the coagulation treatment, in order to produce a finely homogeneous coagulated particle and to adsorb the particle on the surface of the low-molecular weight polymer powder, it is preferred to conduct the treatment under conditions of a temperature below the glass transition temperature (Tg) of the emulsion polymer used.

The heating treatment subsequent to the coagulation treatment is preferably conducted under conditions of a temperature of Tg or above of at least one of the polymers. The heat treatment causes particles of both polymers to firmly fuse to each other to form a composite resin. The composite resin thus produced is subjected to post-treatments, for example, filtration, washing, dehydration and drying, and then used as a resin for a toner.

As described above, in the present invention, the low-molecular weight polymer is fed in the form of a powder, and the high-molecular weight polymer is fed in the form of an emulsion. Therefore, even when there is a remarkable difference in the molecular weight between both polymers or the proportions of mixing of both polymers are any one, a composite resin in a homogeneously mixed state can be advantageously very easily produced in a short time. When the composite resin for a toner which is in a highly homogeneous and integrated state is melt-kneaded with an additive for a toner, such as a colorant, by means of a hot kneader, the state of mixing of both polymers is further homogenized, so that excellent electrophotographic properties can be imparted to the toner.

Since the composite resin produced according to the process of the present invention comprises a particle having an indefinite configuration comprising an emulsion particle fixed to the surface of a low-molecular weight polymer powder, the kneading property (biting property) of compounding agents for a toner used in the production of a toner, such as a colorant, a releasing agent and a magnetic powder, as well is so good that the kneading time can be shortened and the reproducibility and reliability as well are high.

Further, in the process for producing the composite resin according to the present invention, since a low-molecular weight polymer as one component is added in the form of a powder, the dispersion of the powder in water is so good that an increase in the viscosity at the time of mixing or coagulation treatment is much smaller than the case of the conventional mixing of emulsions with each other, which enables the amount of use of water to be reduced. Further, despite the fact that an emulsion polymer in a fine particle form is used as one component of the composite resin, since the finely obtained composite resin is a polymer in a bead form having a relatively large particle size, post-treatments such as dehydration and washing can be conducted with a high efficiency.

The present invention will now be described in more detail with reference to the following Examples. In the Examples, the proportions of mixing of individual components are expressed in terms of "parts by weight".

Preparation of Low-molecular Weight Polymer Powder (1) Low-molecular weight polymer powders (A), (B), (C), (D) and (E)

A mixed monomer comprising 85 parts of styrene and 15 parts of butyl acrylate was subjected to suspension polymerization, and the resultant polymer particle was washed, dehydrated and dried to give a styrene-acrylic copolymer powder having a Mw value of $9.8 \times 10^3$ and a Tg value of 69° C. The resultant polymer powder was classified into particles having the following particle diameter ranges by means of a JIS standard sieve to give polymer powders.

Polymer powder (A): particle diameter of 100 to 800 μm

Polymer powder (B): particle diameter of 100 to 1600 μm

Polymer powder (C): particle diameter of 30 to 80 μm

Polymer powder (D): particle diameter exceeding 2000 μm

Polymer powder (E): particle diameter of less than 20 μm (2) Low-molecular weight polymer powder (F)

A mixed monomer comprising 82 parts of styrene and 18 parts of butyl acrylate were subjected to suspension polymerization, and the resultant polymer particle was washed, dehydrated and dried to give a styrene-acrylic copolymer powder comprising 90% or more of particles having a Mw value of $7.4 \times 10^4$, a Tg value of 68° C. and a particle diameter of 100 to 800 μm.

(3) Low-molecular weight polymer powder (G)

A mixed monomer comprising 90 parts of styrene and 10 parts of butyl acrylate were subjected to suspension polymerization, and the resultant polymer was treated in the same manner as that described above to give a styrene-acrylic copolymer powder comprising 90% or more of particles having a Mw value of $5.4 \times 10^3$, a Tg value of 68° C. and a particle diameter of 100 to 800 μm.

(4) Low-molecular weight polymer powder (H)

A saturated polyester resin (terephthalic acid/ethylene glycol, $Mw = 10.3 \times 10^3$, $Tg = 68°$ C.) was pulverized and classified by means of a JIS standard sieve to regulate the particle diameter to 100 to 800 μm.

Preparation of High-molecular Weight Polymer Emulsion (1) High-molecular weight polymer emulsion (a)

A mixed monomer comprising 70 parts of styrene and 30 parts of butyl acrylate were subjected to emulsion polymerization in water containing an anionic emulsifier and potassium persulfate (polymerization initiator) to give a high-molecular weight styrene-acrylic copolymer having a solid matter content of 32.6% and a Mw value of $2.1 \times 10^6$.

(2) High-molecular weight polymer emulsion (b)

A mixed monomer comprising 90 parts of styrene and 10 parts of butyl acrylate was subjected to emulsion polymerization in water containing an anionic emulsifier and potassium persulfate (polymerization initiator) to give a high-molecular weight styrene-acrylic copolymer having a solid matter content of 24.6% and a Mw value of $4.2 \times 10^6$.

(3) High-molecular weight polymer emulsion (c)

A mixed monomer comprising 70 parts of styrene and 30 parts of butyl acrylate were subjected to emulsion polymerization in water containing an anionic emulsifier and potassium persulfate to give a high-molecular weight styrene-acrylic copolymer having a solid matter content of 34.4% and a Mw value of $6.3 \times 10^5$.

(4) High-molecular weight polymer emulsion (d)

A commercially available styrene-butadiene copolymer emulsion (styrene/butadiene copolymer ratio = 80/20, solid matter content = 40%, $Mw = 1.2 \times 10^6$, $Tg = 63°$ C.).

EXAMPLE 1

Preparation of Composite Resin for Toner 80 parts of the low-molecular weight polymer powder (A) and 61 parts of the high-molecular weight polymer emulsion (a) were dispersed in 220 parts of deionized water, and the dispersion was adjusted to have a pH value of 2.5. 32 parts of a 5% aqueous $Ca(NO_3)_2$ solution was added thereto with stirring to conduct a coagulation treatment of the emulsion. After the completion of the coagulation, the system was heat-treated at 70° C.±2° C. for one hour. The resultant polymer particle was taken out, washed, dehydrated and dried to give a composite resin comprising a high-molecular weight emulsion polymer particle homogeneously fixed in a film form to the surface of the low-molecular weight polymer powder.

In order to evaluate the homogeneous mixing property of the composite resin thus prepared, the composite resin was subjected to hot melt kneading by means of a kneader (Laboplastomill manufactured by Toyo Seiki Seisaku-Sho, Ltd.). As a result, it could be confirmed that the kneaded resin had an excellent transparency and the low-molecular weight polymer component is homogeneously mixed with the high-molecular weight polymer component.

Preparation of Toner

In order to evaluate toner properties of the composite resin prepared above, a toner was prepared by mixing individual components according to the following formulation, heat-kneading the mixture by means of a roll mixer (Laboplastomill manufactured by Toyo Seiki Seisaku-Sho, Ltd.) at 130° C., cooling the kneaded mixture and subjecting the mixture to pulverization and classification to give a toner having a mean particle diameter of 8 to 10 μm.

| | |
|---|---|
| Composite resin | 80 parts |
| Carbon black (MA-100 manufactured by Mitsubishi Chemical Industries, Ltd.) | 4 parts |
| Charge control agent (Bontron S-34 manufactured by Orient Chemical industries, Ltd.) | 2.4 parts |
| Polypropylene (Viscol 550P manufactured by Sanyo Chemical Industry Ltd.) | 1.6 parts |

Evaluation of Toner Properties 10 parts of the toner was mixed with 90 parts of an iron powder carrier (TEFV 250/400 manufactured by Nippon Teppun K.K.) to prepare a developing agent, and an electrostatic image was formed by a conventional electrophotography through the use of an electrophotographic copying machine (DC-191 manufactured by Mita Industrial Co., Ltd.) and developed with the developing agent. The toner image was transferred on a plain paper, and the toner properties were evaluated according to the evaluation method described in the following items (1) to (3). As is apparent from the results given in Table 1, good toner properties could be obtained.

(1) Lower limit of fixation temperature: The above-described transfer paper having a toner image formed thereon was passed through between a fixation roll having a a surface comprising teflon and a pressure roll having a surface comprising a silicone rubber. Fixation was conducted with the fixation roll temperature being varied, and fixed images formed at respective temperatures was rubbed five times through the use of a face pad as a frictional face by means of a film fastness tester under a load of 500 g. The image density was measured before and after the test by means of a Mcbeth densitometer. The minimum fixation roll temperature at which the density can be maintained by 80% or more was regarded as the lower limit of fixation temperature.

(2) Hot offset generation temperature: The fixation roll temperature was varied in the same manner as that described above, and the fixation roll temperature at which the hot offset phenomenon occurred on a fixation paper was regarded as the hot offset generation temperature.

(3) Image quality: The fixed image was subjected to overall evaluation on fogging, visibility, flow of form of character, omission of a thick character portion, etc.

EXAMPLE 2

The procedure of Example 1 was repeated to prepare a composite resin, prepare a toner and evaluate the toner, except that the low-molecular weight polymer powder (B) was used as the low-molecular weight polymer component. As a result, in the evaluation of homogeneous mixing, the composite resin was slightly poor in the kneading property in Laboplastomill. However, the toner properties were good as is apparent from the results given in Table 1.

EXAMPLE 3

The procedure of Example 1 was repeated to prepare a composite resin and a toner, except that the low-molecular weight polymer powder (C) was used as the low-molecular weight polymer component. Since an increase in the viscosity of the mixed system was observed in the step of coagulation treatment in the preparation of a composite resin, 100 g of deionized water was added thereto. No problem occurred due to the addition of water. Further, although the dehydrating property and the drying property were slightly poor, the toner properties were good as given in the following Table 1.

COMPARATIVE EXAMPLE 1

The procedure of Example 1 was repeated to prepare a composite resin and a toner, except that the low-molecular weight polymer powder (D) was used as the low-molecular weight polymer component. The state of mixing in the composite resin lacked in the homogeneity to such an extent that the separation of the suspension particle of the low-molecular weight polymer powder from the emulsion agglomerate could be observed with the naked eye. In the evaluation of homogeneous mixing as well, an unmelted lump was observed in the kneaded melt in the Laboplastomill, and the toner properties as well were poor as is apparent from the results given in the following Table 1.

COMPARATIVE EXAMPLE 2

The procedure of Example 1 was repeated in the same manner as that of Example 1, except that the low-molecular weight polymer powder (E) was used as the low-molecular weight polymer component. As a result, a remarkable increase in the viscosity was observed in the mixing system in the step of coagulation treatment, and the addition of deionized water in an amount as large as 300 parts was necessary for conducting an ordinary coagulation treatment. This lowered the amount of the finally obtained toner, and it took a lot of time to conduct dehydration and washing. Further, as is apparent from the results given in the following Table 1, the toner properties as well were poor probably because impurities could not be completely removed despite washing for a long period of time, and scattering of the toner was observed.

EXAMPLE 4

The procedure of Example 1 was repeated to prepare a composite resin and a toner, except that the low-molecular weight polymer powder (F) was used as the low-molecular weight polymer component and the amount of the deionized water was changed from 220 parts to 130 parts. The state of mixing of both polymer components of the resultant composite resin was homogeneous, and as is apparent from the following Table 1, the toner properties as well were good.

EXAMPLE 5

The procedure of Example 4 was repeated, except that the low-molecular weight polymer powder (G) was used as the low-molecular weight polymer component. As a result, as is apparent from Table 1, the state of mixing in the composite resin was good.

EXAMPLE 6

80 parts of the low-molecular weight polymer powder (A) and 81 parts of the high-molecular weight polymer emulsion (b) were dispersed in 110 parts of deionized water, and the dispersion was adjusted to a pH value of 2.5 with dilute nitric acid. 28 parts of a 5% aqueous $MgSO_4$ solution was added thereto with stirring to conduct a coagulation treatment of the emulsion. After the completion of the coagulation, a heat treatment was conducted at 80°±2° C. for 2 hr. Thereafter, the resultant polymer particle was taken out, washed, dehydrated and dried to prepare a composite resin. Then, a toner was prepared therefrom in the same manner as that of Example 1 and then subjected to evaluation on the toner properties. The state of mixing in the composite resin was homogeneous, and as is apparent from the following Table 1, the toner properties as well were good.

EXAMPLE 7

80 parts of the low-molecular weight polymer powder (A) and 58 parts of the high-molecular weight polymer emulsion (c) were dispersed in 140 parts of deionized water, and the dispersion was adjusted to a pH value of 2.5 with dilute nitric acid. 25 parts of a 5% aqueous $CaCl_2$ solution was added thereto with stirring to conduct a coagulation treatment of the emulsion. After the completion of the coagulation, a heat treatment was conducted at 70°±2° C. for 2 hr. The coagulated polymer particle was taken out, washed, dehydrated and dried to prepare a composite resin. The state of mixing in the composite resin was homogeneous, and as is apparent from the following Table 1, the toner properties as well were good.

EXAMPLE 8

A mixed monomer comprising 80 parts of styrene and 12 parts of butyl acrylate were subjected to suspension polymerization in 250 parts of deionized water to give a low-molecular weight polymer powder having a Mw value of $9.0 \times 10^3$ and a Tg value of 69° C. The suspension polymerization system was cooled to 30° C. or below without taking out the polymer powder, and 25 parts of the high-molecular weight polymer emulsion (a) was added and dispersed therein. 20 parts of a 5% aqueous $CaCl_2$ solution was added thereto to conduct a coagulation treatment. After the completion of the coagulation, a heat treatment was conducted at 70°±2° C. for 2 hr. The resultant coagulated particle was taken out, washed, dehydrated and dried to give a composite resin. No problem occurred in the preparation of a composite resin, and a composite resin having an excellent mixing property could be easily prepared. A toner was prepared from the composite resin and evaluated in the same manner as that of Example 1. As a result, good results as given in the following Table 1 were obtained.

EXAMPLE 9

A mixed monomer comprising 60 parts of styrene and 10 parts of butyl acrylate were subjected to suspension polymerization in 200 parts of deionized water to give a low-molecular weight polymer powder having a Mw value of $9.0 \times 10^3$ and a Tg value of 69° C. The suspension polymerization system was cooled to 30° C. or below without taking out the polymer powder, and 92 parts of the high-molecular weight polymer emulsion (a) was added and dispersed therein. 40 parts of a 5% aqueous $CaCl_2$ solution was added thereto, and a coagulation treatment of emulsion was conducted. After the completion of the coagulation, a heat treatment was conducted at 70°±2° C. for 2 hr, and the resultant coagulated particle was taken out, washed, dehydrated and dried to give a composite resin. No problem occurred in the preparation of a composite resin, and a composite resin having an excellent mixing property could be easily prepared. A toner was prepared from the composite resin and evaluated in the same manner as that of Example 1. As a result, good results as given in the following Table 1 were obtained.

EXAMPLE 10

80 parts of the low-molecular weight polymer powder (A) and 50 parts of the high-molecular weight polymer emulsion (d) were dispersed in 140 parts of deionized water, and the dispersion was adjusted to a pH value of 2.5. 28 parts of a 5% aqueous $MgSO_4$ solution was added thereto with stirring to coagulate the emulsion. After the completion of the coagulation, a heat treatment was conducted at 80°±2° C. for 2 hr. Thereafter, the resultant polymerization particle was taken out, washed, dehydrated and dried to give a composite resin, and a toner was prepared therefrom and evaluated. Both polymer components were in a homogeneously mixed state in the composite resin, and as is apparent from the following Table 1, the toner properties as well were good.

EXAMPLE 11

The procedure of Example 1 was repeated to prepare a composite resin and a toner, except that the low-molecular weight polymer powder (H) was used as the low-molecular weight polymer component. Both polymer components were in a homogeneously mixed state in the composite resin, and as is apparent from the following Table 1, the toner properties as well were good.

COMPARATIVE EXAMPLE 3

100 parts of the high-molecular weight polymer emulsion (a) was gradually added to 400 parts of deionized water containing 2.5 parts of $Ca(NO_3)_2$ to conduct a coagulation treatment. Subsequently, a heat treatment was conducted at 70°±2° C. for 2 hr. The resultant coagulated polymer particle was taken out, subjected to repetition of washing and dehydration, and finally dried to take out a high-molecular weight polymer powder from the high-molecular weight polymer emulsion (a).

20 parts of the high-molecular weight polymer powder was preliminarily mixed with 80 parts of the low-molecular weight polymer powder (A) to give a mixed polymer, and the state of mixing both polymer components in the mixed polymer was evaluated in the same manner as that of Example 1. As a result, the low-molecular weight polymer component alone was melted, and the high-molecular weight polymer component was in a mixed and dispersed state in the form of a lump in the molten low-molecular weight polymer component. That is, the mixed polymer was poor in the homogeneous mixing property. A toner was prepared therefrom in the same manner as that of Example 1 and evaluated. As a result, as is apparent from the following Table 1, the toner properties were poor and unsuitable for use as the toner.

COMPARATIVE EXAMPLE 4

A mixed monomer comprising 90 parts of styrene and 10 parts of butyl acrylate was subjected to emulsion polymerization in water containing an anionic emulsifier and potassium persulfate (polymerization initiator) to give a low-molecular weight styrene-acrylic copolymer emulsion (e) having a solid matter content of 34.2% and a Mw value of $9.5 \times 10^3$.

234 parts of the low-molecular weight polymer emulsion (e) and 61 parts of the high-molecular weight polymer emulsion (a) were gradually added to 400 parts of deionized water containing 2.5 parts of $Ca(NO_3)_2$ to conduct a coagulation treatment. The viscosity increased with the advance of coagulation, and it was difficult to complete the coagulation treatment without the addition of 400 parts of deionized water. Subsequently, a heat treatment was conducted at $70° \pm 2°$ C. for 4 hr to give a coagulated polymer particle. Thereafter, the coagulated polymer particle was taken out, subjected to washing and dehydration and finally dried to take out a composite resin particle. The homogeneous mixing property of the composite resin was evaluated in the same manner as that of Example 1. It could be confirmed that the melt-kneaded resin was excellent in the transparency and both polymer components were in a homogeneously mixed state. However, since the resultant composite resin particle was fine, impurities contained in the particle could not be completely removed despite sufficient washing and dehydration. The kneaded resin had a pale yellow color probably due to insufficient removal of impurities. A toner was prepared therefrom and evaluated in the same manner as that of Example 1. As a result, as is apparent from the following Table 1, the toner properties as well were poor.

TABLE 1

| Evaluation item Ex. No. | Lower limit of fixation temp. (°C.) | Hot offset generation temp. (°C.) | Image* quality |
| --- | --- | --- | --- |
| Ex. 1 | 160 | 225 | ⊚ |
| 2 | 160 | 225 | ○ |
| 3 | 160 | 225 | ○ |
| 4 | 170 | 225 | ⊚ |
| 5 | 150 | 220 | ⊚ |
| 6 | 165 | 240 | ⊚ |
| 7 | 160 | 215 | ⊚ |
| 8 | 145 | 210 | ⊚ |
| 9 | 170 | 240 | ⊚ |
| 10 | 160 | 220 | ⊚ |
| 11 | 150 | 225 | ⊚ |
| Comp. Ex. 1 | 170 | 190 | X |
| 2 | 160 | 225 | Δ |
| 3 | 170 | 180 | X |
| 4 | 160 | 225 | X |

Note) Criteria for evaluation of image quality:
⊚: The image is free from fogging, flow of a character, omission of a thick character portion and very excellent in the visibility and resolution.
○: The image is substantially free from fogging, flow of a character, omission of a thick character portion, etc. and very excellent in the visibility and resolution.
Δ: The image lacks in the visibility, resolution, etc. and is unsuitable for practical use.
x: The image is poor in the visibility, resolution, etc. and unsuitable for practical use.

The present invention enables a composite resin for a toner excellent in both the fixation and non-hot-offset property to be produced by a simple and easy process which comprises mixing a low-molecular weight polymer powder with a high-molecular weight polymer emulsion and subjecting the mixture to a coagulation treatment and then a heat treatment, which renders the present invention useful from the practical viewpoint.

We claim:

1. A process for producing a composite resin for a toner, comprising the steps of:

mixing, in water, (a) low-molecular weight polymer powder comprising particles, not less than 80% by weight of said particles having a diameter of from 20 to 2000 microns, the weight average molecular weight of said low-molecular weight polymer being in the range of from 5,000 to 100,000, with (b) a high-molecular weight polymer emulsion, the weight average molecular weight of said high-molecular weight polymer being in the range of from 500,000 to 5,000,000;

subjecting the thus obtained mixture to a coagulation treatment; and heating the resulting mixture to obtain a composite resin in which the low-molecular weight polymer particle and the high-molecular weight polymer are fixed and homogeneously mixed with each other.

2. The process according to claim 1, wherein the proportions of mixing the low-molecular weight polymer powder and the high-molecular weight polymer emulsion (in solid basis) are in the range of from 65 to 95% by weight and in the range of from 35 to 5% by weight, respectively.

3. The process according to claim 2 in which the weight average molecular weight of said low molecular weight polymer is in the range of 8,000 to 60,000 and the weight average molecular weight of said high molecular weight polymer is in the range of 2,000,000 to 5,000,000.

* * * * *